(12) United States Patent
Gens et al.

(10) Patent No.: US 11,649,745 B2
(45) Date of Patent: May 16, 2023

(54) DIAGNOSTIC METHOD FOR AN OIL PISTON COOLING JET VALVE, DIAGNOSTIC DEVICE, CONTROL UNIT, MOTOR VEHICLE

(71) Applicant: Volkswagen Aktiengesellschaft, Wolfsburg (DE)

(72) Inventors: Julian Gens, Wolfsburg (DE); Christian Ledwig, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/378,092

(22) Filed: Jul. 16, 2021

(65) Prior Publication Data

US 2022/0018269 A1 Jan. 20, 2022

(30) Foreign Application Priority Data

Jul. 16, 2020 (DE) ...................... 10 2020 208 867.5

(51) Int. Cl.
   *F01M 1/20* (2006.01)
   *F01P 3/08* (2006.01)
   *F01M 1/08* (2006.01)

(52) U.S. Cl.
   CPC ................ *F01M 1/20* (2013.01); *F01M 1/08* (2013.01); *F01P 3/08* (2013.01); *F01M 2250/60* (2013.01); *F01M 2250/64* (2013.01)

(58) Field of Classification Search
   CPC .... F01M 1/08; F01M 1/16; F01M 1/18; F01P 3/08; F01P 3/06; F01P 2003/006; F01P 11/14; F01P 2031/00; F01P 2031/20
   See application file for complete search history.

(56) References Cited

U.S. PATENT DOCUMENTS 5,904,226 A * 5/1999 Sakaguchi ............... F01M 1/16
                                                                    123/90.15
8,683,963 B2 * 4/2014 Kobayashi ............... F01P 3/06
                                                                    123/196 R (Continued)

FOREIGN PATENT DOCUMENTS

DE       102018126025 A1     6/2019
EP            3103980 A1    12/2016

(Continued)

*Primary Examiner* — Long T Tran
(74) *Attorney, Agent, or Firm* — Muncy, Geissler, Olds & Lowe, P.C.

(57) ABSTRACT

A diagnostic method for an oil piston cooling jet valve of an oil pressure system of an internal combustion engine of a motor vehicle, including: Driving the OPCJ valve for detecting oil pressure diagnostic data if multiple enabling conditions have been met, the multiple enabling conditions including: Presence of a stationary operation of the internal combustion engine; presence of a predetermined operating range; presence of an oil temperature within a predetermined oil temperature range; prevention of a scheduled driving of the OPCJ valve for regular piston cooling; and prevention of an error of the oil pressure system. The diagnostic method further including: Determining whether an oil pressure measuring point is within a predefined oil pressure measuring point range. The invention further relates to a diagnostic device, a control unit and a motor vehicle, which are each suitable or configured for carrying out the method.

18 Claims, 3 Drawing Sheets

(56) References Cited

U.S. PATENT DOCUMENTS

| | | | |
|---|---|---|---|
| 9,121,334 B2 * | 9/2015 | Honda | F01M 1/08 |
| 9,140,152 B2 | 9/2015 | Bruno et al. | |
| 10,233,816 B2 * | 3/2019 | Honda | F01M 1/08 |
| 11,009,426 B2 | 5/2021 | Han et al. | |
| 2009/0229561 A1 * | 9/2009 | Yamashita | F01M 1/16 |
| | | | 123/196 R |
| 2011/0224883 A1 | 9/2011 | Bruno et al. | |
| 2012/0132172 A1 * | 5/2012 | Kobayashi | F01P 3/06 |
| | | | 123/196 R |
| 2012/0296518 A1 | 11/2012 | Bruno et al. | |
| 2013/0000596 A1 * | 1/2013 | Diaz Escano | F02M 25/03 |
| | | | 123/25 A |
| 2015/0027388 A1 * | 1/2015 | Honda | F01M 1/08 |
| | | | 123/41.35 |
| 2016/0186642 A1 * | 6/2016 | Honda | F01P 3/08 |
| | | | 123/41.35 |
| 2016/0363040 A1 | 12/2016 | Kim | |
| 2019/0078493 A1 * | 3/2019 | Kim | F02F 3/16 |
| 2021/0231529 A1 | 7/2021 | Han et al. | |

FOREIGN PATENT DOCUMENTS

| | | |
|---|---|---|
| EP | 3 783 219 A1 | 2/2021 |
| GB | 2478545 A | 9/2011 |
| JP | 2008-038705 A | 2/2008 |
| JP | 2014-098344 A | 5/2014 |
| JP | 2017-031938 A | 2/2017 |

\* cited by examiner

DIAGNOSTIC METHOD FOR AN OIL PISTON COOLING JET VALVE, DIAGNOSTIC DEVICE, CONTROL UNIT, MOTOR VEHICLE

This nonprovisional application claims priority under 35 U.S.C. § 119(a) to German Patent Application No. 10 2020 208 867.5, which was filed in Germany on Jul. 16, 2020, and which is herein incorporated by reference.

BACKGROUND OF THE INVENTION

Field of the Invention

The present invention relates to a diagnostic method for an oil piston cooling jet valve, a diagnostic device, a control unit and a motor vehicle.

Description of the Background Art

Different types of oil pressure systems exist for internal combustion engines, for example those including a constant displacement pump, including a step-adjustable pump and those including a fully variable pump.

If a constant displacement pump or a step-adjustable pump is used, one or multiple oil pressure switches may be provided. Alternatively, an oil pressure sensor may also be used. In the case of a fully variable oil pump, an oil pressure sensor is typically used, which continuously detects the oil pressure in the oil pressure system.

If a switchable piston cooling is used, the oil pressure system may additionally include one or multiple oil piston cooling jet valves (OPCJ valves). A OPCJ valve may either be provided centrally for multiple pistons, or a separate OPCJ valve may be provided for each piston.

In a four-cylinder reciprocating-piston internal combustion engine, for example, four OPCJ valves may be provided. However, internal combustions engines are known, in which two OPCJ valves are provided for six or eight pistons.

OPCJ valve(s) is/are typically arranged in a secondary gallery (also known as an oil piston cooling jet gallery) of an oil pressure system of an internal combustion engine. A cooling and/or a lubrication of different components is/are thus implemented, for example of a connecting rod bearing, a turbocharger, a main bearing, one (or multiple) camshaft(s), a camshaft phase adjuster and the like. A lubrication/cooling of component groups (for example pistons and/or cylinder walls) is also possible.

To cool and lubricate components of the piston and the cylinder wall, the OPCJ valve may be driven in such a way that oil is sprayed from the secondary gallery into the main gallery via oil piston cooling jets (i.e. against the pistons).

To detect the functionality of the OPCJ valve, it is known to use an oil pressure switch or sensor in the secondary gallery.

A method is known from the patent application GB 2478545 A for diagnosing a failure of an oil piston cooling jet valve (OPCJ valve for short). However, no enabling conditions may be provided for the method, which ensure that a scheduled piston cooling does, in fact, not take place. In addition, only a few variables are used for enabling the method. The risk exists that an error (false failure) is erroneously diagnosed, or that a good result (false pass) is erroneously diagnosed. Moreover, only a passive diagnosis is provided therein, which may possibly supply inaccurate results.

SUMMARY OF THE INVENTION

It is therefore an object of the present invention to provide a diagnostic method for an OPCJ valve, a diagnostic device, a control unit as well as a motor vehicle, which at least partially overcome the aforementioned disadvantages.

According to a first aspect, a diagnostic method according to the invention for an oil piston cooling jet valve (OPCJ valve) of an oil pressure system of an internal combustion engine of a motor vehicle comprises: Driving the OPCJ valve for detecting oil pressure diagnostic data if multiple enabling conditions have been met, the multiple enabling conditions including: Presence of a stationary operation of the internal combustion engine; Presence of a predetermined operating range; Presence of an oil temperature within a predetermined oil temperature range; Prevention of a scheduled driving of the OPCJ valve for regular piston cooling; and Prevention of an error of the oil pressure system; and the diagnostic method further comprises: Determining whether an oil pressure measuring point is within a predefined oil pressure measuring point range.

According to a second aspect of the present invention, a diagnostic device for an oil piston cooling jet valve (OPCJ valve) of an internal combustion engine of a motor vehicle is configured to carry out a diagnostic method according to the first aspect.

According to a third aspect of the present invention, a control unit for a motor vehicle comprises a diagnostic device according to the second aspect.

According to a fourth aspect of the present invention, a motor vehicle includes a diagnostic device according to the second aspect and/or a control unit according to the third aspect.

As described above, OPCJ valves are generally known. To diagnose whether an OPCJ valve is functioning properly, an oil pressure switch may be provided, in particular for the secondary gallery. However, an oil pressure switch of this type may cause additional costs, and it is also generally desirable to save components to thereby lower the susceptibility to errors.

A further diagnosis possibility is to detect an expected oil pressure value, which is achieved at a predetermined point in time after a constant oil pressure has prevailed in the main gallery for a certain period of time.

However, it has been found that the condition of having a constant pressure in the main gallery may not be sufficient, since a measurement error may occur if a method of this type is carried out and a cooling must take place in the meantime (due to operation).

It has also been found that an expected value of the oil pressure may depend on an operating state of the internal combustion engine.

Moreover, it has also been found that defining a precise point in time instead of a time window for when an expected oil pressure is reached may be susceptible to errors.

A further possibility for a diagnosis of the OPCJ valve is the presence of an oil pressure sensor in the secondary gallery. However, this is also associated with increased component and assembly costs.

Some exemplary embodiments therefore relate to a diagnostic method for an oil piston cooling jet valve (OPCJ valve) of an oil pressure system of an internal combustion engine of a motor vehicle, comprising: Driving he OPCJ valve for detecting oil pressure diagnostic data if multiple enabling conditions have been met, the multiple enabling conditions including: Presence of a stationary operation of the internal combustion engine; Presence of a predetermined operating range; Presence of an oil temperature within a predetermined oil temperature range; Prevention of a scheduled driving of the OPCJ valve for regular piston cooling; and Prevention of an error of the oil pressure system; and the diagnostic method further comprising: Determining whether an oil pressure measuring point is within a predefined oil pressure measuring point range.

Known OPCJ valves are typically provided in a secondary gallery of an oil circuit of an internal combustion engine and may be designed as an electrical or mechanical switching valve.

By opening the OPCJ valve, oil may flow through jets, which are provided in the secondary gallery. Oil is applied to a piston crown of a piston of the internal combustion engine for the purpose of cooling and/or lubricating the piston (for example, also its add-on parts, such as piston rings and piston pins). or a cylinder barrel.

The OPCJ valve according to the present invention may be driven, i.e. opened or closed, to apply oil to the piston, even if no cooling of the piston is necessary or has been provided as scheduled. The diagnostic method may thus be initiated and it may be diagnosed whether the OPCJ valve is functioning properly.

According to the non-scheduled driving of the OPCJ valve, it is checked whether an oil pressure measuring point is within a predefined oil pressure measuring point range.

Oil pressure diagnostic data is detected for this purpose. This data is provided by an oil pressure sensor, which is situated in the main gallery or a main oil circuit of an oil pressure system.

An additional oil pressure switch or sensor for the secondary gallery may thus be eliminated.

Exemplary embodiments exist, in which multiple enabling conditions must be met for driving the OPDJ valve. An error-minimized diagnosis may thus take place.

An enabling condition may be the presence of a stationary operation of the internal combustion engine.

A more resilient diagnosis result may be achieved thereby. If the oil pressure runs dynamically (i.e. not in a stationary manner), e.g. by adjusting a camshaft, fluctuations or interference of the oil pressure signal may corrupt a diagnostic criterion.

To establish whether the internal combustion engine is in a stationary operation, multiple variables may be considered.

For example, an engine rotational speed, an engine torque, an angle of an intake camshaft and an angle of an exhaust camshaft should be mentioned here, without the present invention being limited thereto.

In addition, an (arbitrary) subset of the aforementioned variables may be considered, for example only the engine rotational speed or the engine rotational speed together with the angle of the intake camshaft.

Each considered variable may then be defined as stationary if it does not change within a range defined therefor. For example, it may be defined for the engine rotational speed that it is considered stationary if a deviation of less than fifty revolutions per minute is present (whereby a range of a hundred revolutions per minute is spanned).

Likewise, it may be defined for an angle range of a camshaft that it is considered stationary if it changes by less than two degrees.

In other words: A stationary operation may be present if a gradient of the considered variable(s) is below a predefined threshold value.

Exemplary embodiments exist, in which the instantaneous values of the aforementioned variables are compared with low pass-filtered historic values to precisely identify the stationary operation (the present invention not being limited to the use of a low-pass filter). A point in time up to which the historic data is ascertained may be predetermined separately for each variable. A difference between the instantaneous data and the low-pass-filtered data may be subsequently ascertained, the ascertained difference having to be below a predefined limit value in order for the operation to be considered stationary.

In some exemplary embodiments, a temporal debouncing may then take place for each variable, using a separate time constant. This means that, in addition, each variable must be stationary for a predetermined period of time for the enabling to take place.

If such dynamic evaluations for the required times are below the required threshold values of the differences, the operation may be considered stationary.

A further enabling condition may be a presence of a predetermined operating range.

The aforementioned and further variables may be considered for this purpose.

For example, the oil temperature may be additionally or alternatively taken into account.

The operating range may be predetermined in such a way that, for example, the engine rotational speed must be within a predefined interval (e.g. between eight hundred and one thousand revolutions per minute). Moreover, it may be predetermined that the oil temperature must be between ninety and ninety-five degrees Celsius in order for this enabling condition to be met, without the present invention being limited thereto.

In some exemplary embodiments, the predetermined operating range for the engine rotational speed is defined as a function of the oil temperature and/or the engine torque. For example, a characteristic map may be provided, which visualizes a dependency of the engine rotational speed and/or the engine torque.

For example, the predetermined operating range may be reached for one thousand revolutions per minute if an oil temperature between ninety-one and ninety-three degrees Celsius and/or an engine torque between fifty and seventy newton meters is/are present, within the present invention being limited thereto.

Individual characteristic maps may also be defined for the considered variables, for example, a characteristic map for defining the dependency of the rotational speed on the oil temperature, and/or a characteristic map for defining the dependency of the rotational speed on the engine torque.

Exemplary embodiments exist, in which a further enabling condition is a presence of the oil temperature within a predetermined oil temperature range.

The oil temperature typically has an influence on the viscosity of the motor oil, which, in turn, has an influence on the recorded oil pressure measuring points.

Moreover, it is typically necessary for a piston cooling to take place when the oil temperature exceeds a limit value. However, a scheduled piston cooling should be prevented.

If a piston cooling strategy is dependent on an oil temperature, an oil temperature range provided therefor may be prevented from the outset. In addition, excessively high or excessively low oil temperatures may be prevented, since, in some exemplary embodiments, such temperatures are not to be considered for an empirical ascertainment of error thresholds.

However, the oil temperature range may also depend on the present engine rotational speed or on other variables.

A further enabling condition is a prevention of a scheduled driving of the OPCJ valve for regular piston cooling.

The OPCJ valve is generally opened to cool or lubricate its piston (as well as its add-on parts and the cylinder wall(s)). A driving of this type may take place when a predetermined operating range is present (which may, in principle, be defined differently than the operating range which must be present to carry out the diagnostic method according to the invention).

In some exemplary embodiments, this (scheduled) opening of the OPCJ valve is to be prevented to carry out the diagnostic method according to the invention. It may thus be ensured that the diagnostic method is carried out only if there is no need for the piston to be cooled and/or lubricated.

For example, if a clocked piston cooling is provided (which may be provided depending on the operating range), in which the OPCJ valve is intermittently opened and closed, the diagnostic method may be blocked for a duration of this intermittent operation (in particular, also in the shutdown phases of the intermittent operation).

The scheduled piston cooling may then take place without it impairing a diagnosis. An interruption of the diagnostic method by an intermittent operation which (again) sets in may thus also be prevented.

A further enabling condition in some exemplary embodiments is a prevention of at least one or multiple different error states in the oil pressure system. For example, if an oil pressure sensor, an oil pump control valve, a (different or the same) oil piston cooling jet valve, an oil temperature sensor or one or multiple other sensors or actuators in the oil pressure system are detected as being defective, the diagnostic method may be blocked.

One or multiple errors which induce a maximum possible oil pressure and/or deactivate the oil pressure control as a compensating reaction may also block the diagnostic method.

An error of the oil pressure system, i.e. of the OPCJ valve, detected by the diagnostic method may also block the diagnostic method for future iterations.

In addition, an (arbitrary) subset of the aforementioned error sources may be considered.

If the specified enabling conditions (or a subset thereof) are present, it is determine in some exemplary embodiments whether an oil pressure measuring point is within a predefined oil pressure measuring point range.

The indicated enabling conditions have the advantage that a reproducible and high selectivity of the diagnostic method is achievable for a scheduled operation of the OPCJ valve. False-failure and false-pass results may be minimized thereby.

The oil pressure measuring point may be determined by an oil pressure measurement.

For example, the internal combustion engine may include an oil pressure sensor in a main gallery, which is configured to ascertain an oil pressure at different points in time. An oil pressure measuring point may then represent a tuple of a measured oil pressure at a measuring time.

In some exemplary embodiments, these two coordinates (measured oil pressure and measuring time) of the oil pressure measuring point must meet a predetermined requirement.

The requirement for the measured oil pressure may comprise the fact that it has an absolute value which is above an absolute value of a predefined oil pressure threshold value. For this purpose, the oil pressure may be compared at regular intervals (e.g. cyclically) during the measuring time with an oil pressure at the beginning of the measuring time (hereinafter referred to as the starting oil pressure), so that positive or negative differences of the measured oil pressure, compared to the starting oil pressure, may be detected.

If the OPCJ valve is opened, a pressure drop may occur. For example, if a negative difference is expected, this should be below the predefined oil pressure threshold value.

If the OPCJ valve is closed, a pressure increase may occur. For example, if a positive difference is expected, this should thus be above the predefined oil pressure threshold value.

The requirement for the measuring time may comprise the fact that the absolute value of the predefined oil pressure threshold value is exceeded within a predefined time window.

In other words: An expected oil pressure peak (e.g. a maximum of a (symbolic) oil pressure curve) or dip (e.g. a minimum of a (symbolic) oil pressure curve) after opening or closing the OPCJ valve must be within the predefined time window after the opening or closing. It is thus checked whether the oil pressure peak (or dip) having the desired amplitude sets in within the time window to be expected.

The time window may be variable, depending on the engine rotational speed and/or an oil temperature. This dependency may be stored, for example, in control unit data.

The predefined oil pressure measuring point range defines a minimum value of the oil pressure to be expected as well as the time window within which the expected oil pressure peak or dip lies.

Similarly to the time window, an error threshold may be determined for the amplitude to be reached depending on the engine rotational speed and the oil temperature.

The oil pressure measuring point is thus within the predefined oil pressure measuring point range if an oil pressure exceeds a predefined oil pressure threshold value and a point in time at which the oil pressure exceeds the predefined oil pressure threshold value is within a predefined time interval.

In some exemplary embodiments, an oil pressure setpoint value may be increased before the start of the diagnostic method, so that an oil pressure dip may be advantageously detected at a higher measuring level. After an oil pressure setpoint value increase of this type, it is possible to wait for a predefined period of time so that the set (or adjusted) oil pressure may become stationary, i.e. adjust to the predefined stationary oil pressure setpoint value.

If the oil pressure is almost identical to the setpoint value (i.e. if a control deviation between the set oil pressure and the oil pressure setpoint is less than a predefined absolute value), the oil pressure may be regarded as stationary. If the control deviation drops below this predefined absolute value, the OPCJ valve may be driven according to the invention. The predefined absolute value of the control deviation may be stored, for example, in a control unit as control unit data or the like.

In some exemplary embodiments, the operating range is represented by at least one of the variables of engine rotational speed, engine torque and oil temperature.

In some exemplary embodiments, a stationary operation of the internal combustion engine is present when the engine rotational speed changes within a predefined engine rotational speed range, the engine torque changes within a predefined engine torque range and/or an angle of the intake camshaft and/or the exhaust camshaft changes in each case within a predefined angle range, as discussed above.

In some exemplary embodiments, the driving comprises an opening and/or closing of the OPCJ valve.

This results in the advantage than an active (intrusive) diagnosis is carried out, which may result in a greater diagnosis accuracy.

In some exemplary embodiments, a distinction may be made between three diagnosis results: (a) OK (okay) case: The pressure peak is within the expected time window AND reaches the required amplitude; (b) NOK (not okay) case: The pressure peak is too low; or (c) Unusable: The pressure peak has the required amplitude, but it is outside the time window.

With the aid of c), a possible superimposed oil pressure disturbance may be taken into account.

The duration of a diagnostic event may be defined for c) with a predefined (constant) time, i.e. a time period may be provided, in which the oil pressure is examined. This time may be longer than the time window of the expected oil pressure peak (or dip). In some exemplary embodiments, the time for a diagnostic event corresponds at least to the time in which the expected time window of the oil pressure measuring point range closes.

If an absolute value of an oil pressure peak, which is not within the expected time window, is measured within the time of the diagnostic event, but exceeds the required absolute value of the oil pressure threshold value, case c) may be present.

In other words: In some exemplary embodiments, the diagnosis result is discarded if the diagnostic method shows that the oil pressure measuring point exceeds the oil pressure threshold value at a point in time, which is within a diagnostic event time window and outside the predefined time interval.

The oil pressure measuring point may result from the search for a local maximum (or minimum), so that an oil pressure measuring point is within the diagnostic event time window. This means that, in some exemplary embodiments, the oil pressure measuring point may be within the diagnostic event time window but outside the expected time window, in which the diagnostic event may be assessed to be good or poor.

In other words: The local maximum or minimum may be within or outside the expected time window. If it is additionally outside the diagnostic event time window, which includes at least the expected time window, the result may be discarded.

However, in some exemplary embodiments, a regular activation of the OPCJ valve may not be used as the diagnostic event, since, upon a regular activation of the OPCJ valve (i.e. for cooling), a function (for example, a compensation function) may be provided, which is intended to compensate for an oil pressure drop (or peak or dip), which is in competition with the presence of a peak or dip as the diagnostic criterion.

In some exemplary embodiments, a function of this type is therefore deactivated for the diagnostic method.

Some exemplary embodiments relate to a diagnostic device for an oil piston cooling jet valve (OPCJ valve) of an internal combustion engine of a motor vehicle, which is configured to carry out a diagnostic method according to one of the preceding claims.

The diagnostic device may be designed or configured as a control unit, a central on-board computer, CPU (central processing unit) and the like. The diagnostic device may also be further connectable to the motor vehicle externally via an interface, e.g. in that it is designed as a computer, smartphone or the like. In exemplary embodiments of this type, the motor vehicle additionally has a control unit, which is configured to drive the OPCJ valve when it receives a corresponding prompt from the (external) diagnostic device. A diagnostic method according to the invention may advantageously be carried out on a test bench.

In some exemplary embodiments, the diagnostic device comprises a positive counter device, which is configured to increment a positive count value if the diagnostic method determines that the oil pressure measuring point is within the predetermined oil pressure measuring point range, and comprises a negative counter device, which is configured to increment a negative count value if the diagnostic device determines that the oil pressure measuring point is outside the predefined oil pressure measuring point range.

The particular counters may be designed as electrical components, which count, for example, a number of current or voltage pulses. The counters may also be implemented as pure software in a diagnostic program.

This results in the advantage that a statistical security may be ensured, that the diagnosis result is correct (i.e. that no false-failure or false-pass result is present). In other words individual false-failure results and/or false-pass results do not immediately result in an overall false-pass or false-failure result. In addition, the oil pressure may be reliably monitored for a predetermined period of time. Moreover, the oil pressure may be advantageously monitored even after the time window of the diagnosis. A further advantage is that a discarding of a diagnosis result is possible.

The diagnosis result may be iteratively carried out in a diagnostic device according to the invention, so that a sufficient number of measurements may take place, so that, for example, an (individual) false-failure or false-pass result does not necessarily result in an (erroneous) error message in the motor vehicle. The positive counter and the negative counter may be of the same or of different counter types. In general, a counter may also be provided, which is positively incremented in the case of a positive result and negatively incremented in the case of a negative result.

In addition, one iteration may be carried out by an opening of the OPCJ valve, and one iteration may be carried out by a subsequent closing of the OPCJ valve. Two opening operations may also each represent one iteration without an intermediate closing being considered an iteration, because it was induced, for example, by a scheduled piston cooling, and the like.

After a predefined number of times the diagnostic method is carried out, it may then be decided whether the OPCJ valve is functioning properly, e.g. in that the ratio of positive incrementing operations to negative incrementing operations is examined.

In some exemplary embodiments, the diagnosis may also be ended if one of the two counters exceeds a predefined threshold value.

If an enabling condition is violated during a diagnosis, only the instantaneous iteration may be ended, while the counters are not reset.

The negative count value is incremented in some exemplary embodiments if the oil pressure does not exceed the oil pressure threshold value and/or if the point in time is outside the predefined time interval.

It is sufficient for incrementing the negative count value if only one of the conditions described herein for the oil pressure measuring point is not met, e.g. it is sufficient if the oil pressure peak is measured at the right time but is too weak.

To detect the described case c) (unusable), the measured value may be discarded in some exemplary embodiments if case c) occurs. This means that the negative count value is incremented only if the oil pressure does not exceed the oil pressure threshold value, while the result is discarded if the oil pressure does exceed the oil pressure threshold value, but is outside the predefined time window.

Some exemplary embodiments relate to a control unit for a motor vehicle, which comprises a diagnostic device according to the invention.

The control unit may be a separate control unit, which is configured to control the diagnostic device in such a way that the diagnostic method according to the invention is carried out.

In general, an existing control unit may be used, which may be controlled by the diagnostic device, for example a control unit for a dynamic oil pressure control, the diagnostic device then being able to be formed and configured, for example, within the central on-board computer.

Existing devices may thus be advantageously used, which are already typically provided in a motor vehicle.

Some exemplary embodiments thus relate to a motor vehicle, which includes a diagnostic device according to the invention and/or a control unit according to the invention.

The motor vehicle may be any type of (known) motor vehicles, for example a passenger car, a traction engine, a farm vehicle, a water vehicle and the like, a motor vehicle according to the invention typically including an internal combustion engine having an oil gallery, as described herein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
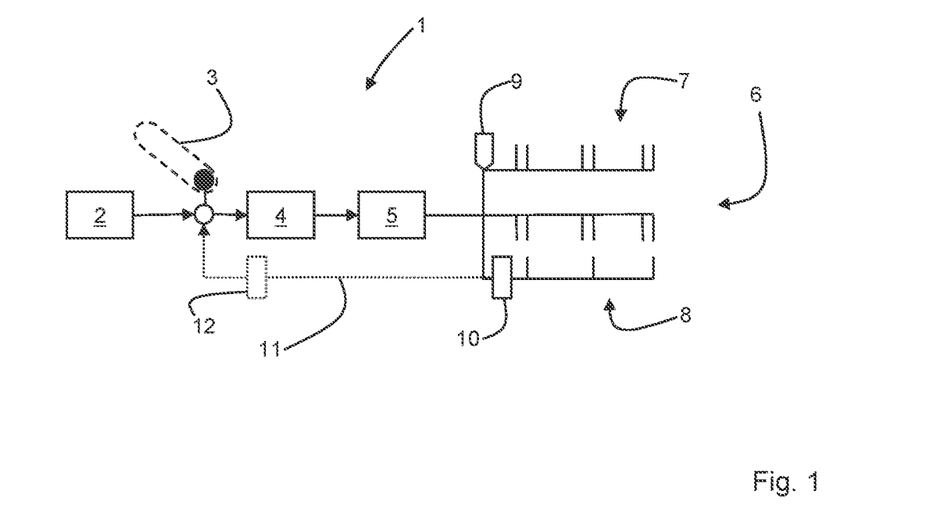
FIG. 1 schematically shows an exemplary embodiment of an oil pressure system according to the present invention.

An exemplary embodiment of an oil pressure system 1 according to the present invention is schematically illustrated in FIG. 1.

Oil pressure system 1 contains an oil pan 2 as well as a variably adjustable oil pump 3. Variably adjustable oil pump 3 pumps oil at a preset pressure from oil pan 2 into an oil filter 4, downstream from which an oil cooler 5 is arranged.

Oil pressure system 1 further includes an oil gallery 6, which has a main gallery 7 and a secondary gallery 8. An oil pressure sensor 9 is arranged in main gallery 7, which is configured to determine an oil pressure in the main gallery. An OPCJ valve 10 is arranged in secondary gallery 8, which is designed as an electronic control valve, as described herein.

Known oil pressure systems additionally include a line 11 and a proportional valve 12, with the aid of which the functionality of OPCJ valve 10 may be checked. However, since the OPCJ valve is driven with the aid of a diagnostic method according to the present invention, after which the oil pressure measuring point is assessed, as described herein, it is advantageously not necessary according to the present invention to provide elements 11 and 12 (which is why they are illustrated by a dashed line).

Figure 2:
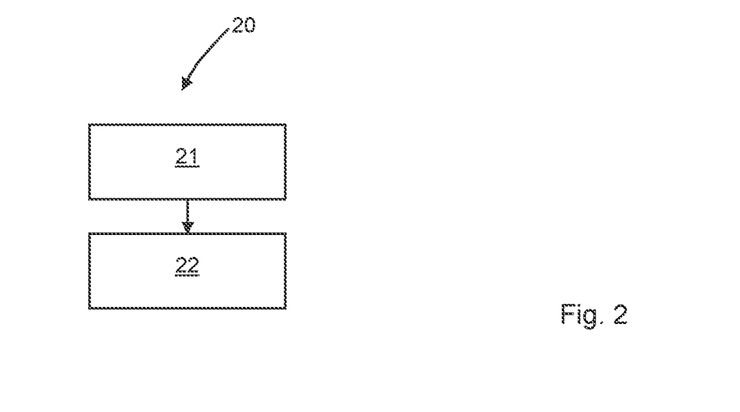
FIG. 2 shows a diagnostic method according to the invention in a block diagram.

FIG. 2 shows an exemplary embodiment of a diagnostic method 20 according to the present invention in a block diagram.

The OPCJ valve is driven in 21, after which it is checked whether the following enabling conditions have been met:

(a) Presence of a stationary operation of the internal combustion engine, as described herein, the stationary operating being present if a particular gradient of the variables engine rotational speed, engine torque, angle of the intake camshaft and angle of the exhaust camshaft is below a particular predefined threshold value.

(b) Presence of a predetermined operating range, as described herein, the engine rotational speed being examined as a function of the engine torque and the oil temperature within a predefined range to assess whether a predetermined operating range is present.

(c) Presence of an oil temperature within a predetermined oil temperature range, as described herein.

(d) Prevention of a scheduled driving of the OPCJ valve for regular piston cooling, as described herein.

(e) Prevention of an error of the oil pressure system, as described herein. If the oil pressure sensor, the oil pump control valve, the oil piston cooling jet valve, the oil temperature sensor or other sensors or actuators in the oil pressure system are detected as being defective, the diagnostic method is blocked.

Even errors which induce a maximum possible oil pressure and/or deactivate the oil pressure control as a compensating reaction block the diagnostic method.

In addition, an (arbitrary) subset of the aforementioned error sources may be considered.

It is determined in 22 whether an oil pressure measuring point is within a predefined oil pressure measuring point range.

Figure 3:
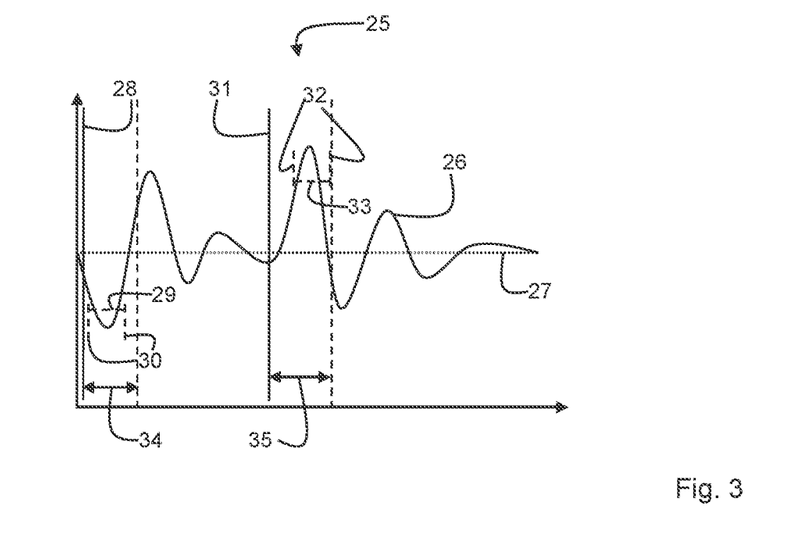
FIG. 3 shows a diagram for assessing the oil pressure measuring point.

FIG. 3 shows a diagram 25 for assessing whether the oil pressure measuring point is within the predefined oil pressure measuring point range.

An oil pressure (ordinate) is plotted against a time (abscissa) on the diagram. A curve 26 thus represents an oil pressure curve which was ascertained by an oil pressure sensor in a main gallery.

Line 27 represents an oil pressure setpoint value, which is present during a normal operation of the internal combustion engine.

Upon an opening 28 of the OPCJ valve, a pressure drop in the main gallery is expected. It is expected that this pressure drop falls below an oil pressure threshold value 29 within a predefined time window 30, which is the case in this exemplary embodiment.

Upon a closing 31, a pressure increase in the main gallery is expected, which is to exceed an oil pressure threshold value 33 within a time window 32, which is also the case here.

Moreover, two further diagnostic event time windows 34 and 35 are provided, in which it is established whether a diagnostic event is present, as described herein. Diagnostic event time window 34 begins upon opening 28 of the OPCJ valve and ends after predefined time window 30. Time window 35 begins upon closing 31 of the OPCJ valve and ends at predefined time window 32.

Figure 4:
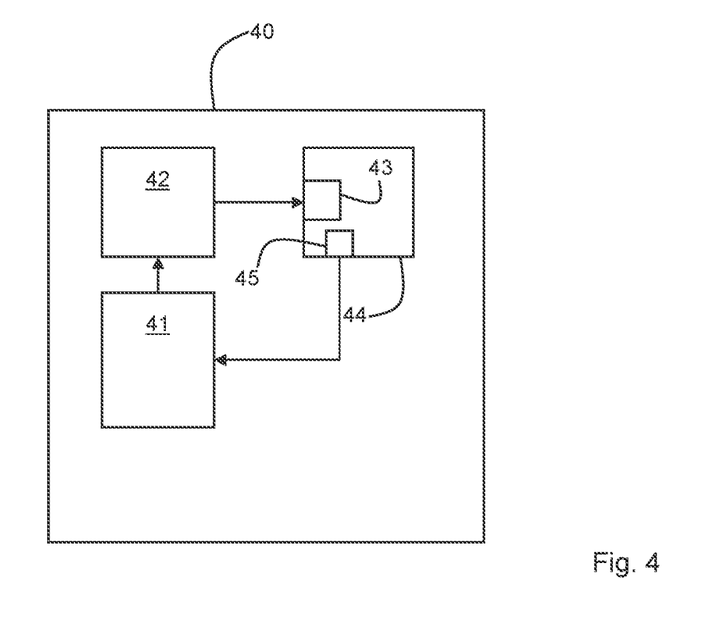
FIG. 4 shows a motor vehicle according to the invention, which includes a diagnostic device according to the invention as well as a control unit according to the invention in a block diagram.

FIG. 4 shows a motor vehicle 40 in a block diagram.

Motor vehicle 40 includes a diagnostic device 41 according to the invention, which is implemented in a central on-board computer. The diagnostic device contains a positive counter and a negative counter, as described herein. The diagnostic device is configured to instruct a control unit 42 to drive an OPCJ valve 43. OPCJ valve 43 is situated in a secondary gallery of an oil pressure system 44. An oil pressure sensor 45, which is configured to ascertain a temporal pressure characteristic, as described herein, is situated in a main gallery of oil pressure system 44. The temporal pressure characteristic is transmitted to diagnostic device 41, which is further configured to determine whether an oil pressure measuring point is within a predefined oil pressure measuring point range, as described herein.

Figure 5:
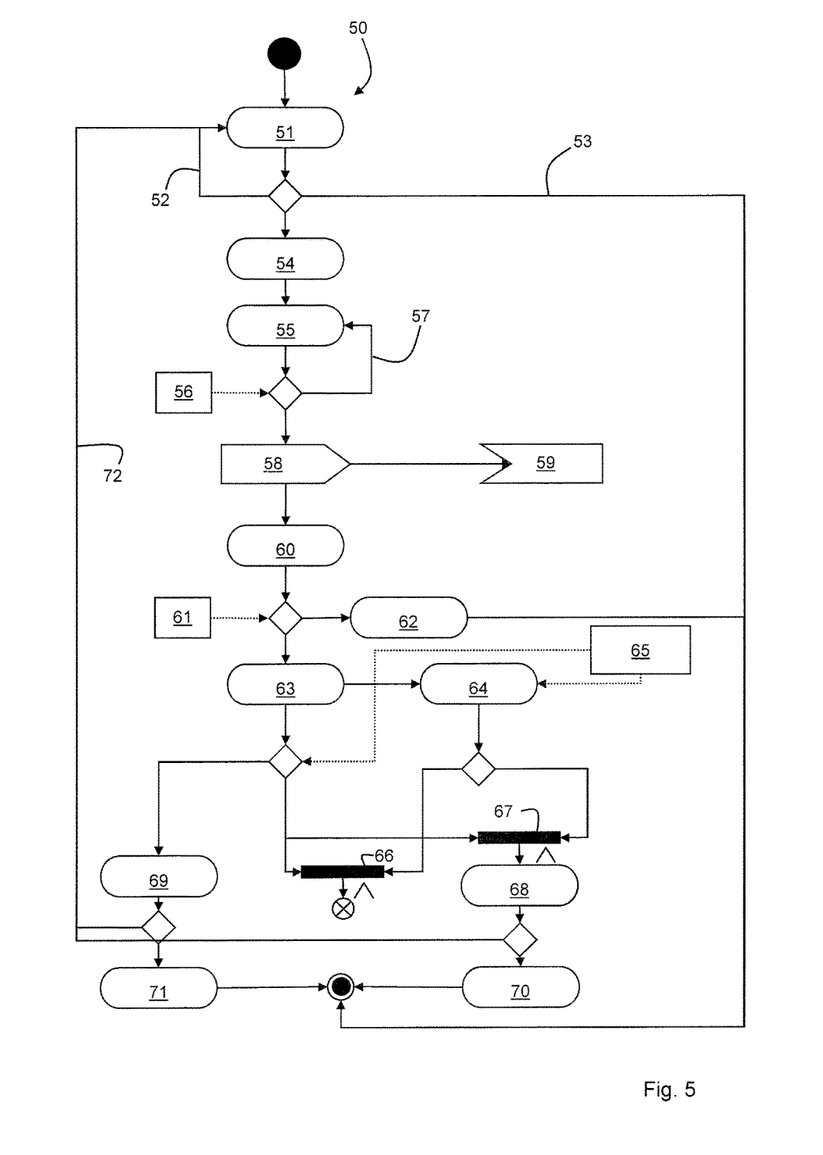
FIG. 5 shows a flow chart of a diagnostic method according to the invention.

FIG. 5 shows a flow chart of a diagnostic method 50 according to the invention.

In 51, it is ascertained whether necessary enabling conditions have been met. This step is carried out at regular intervals, as indicated by arrow 52, even if the diagnostic method itself continues to be carried out (with 54). The diagnostic method may be interrupted thereby (53), if it is established that the enabling conditions are no longer met.

In 54, if the enabling conditions are met, an oil pressure setpoint value, which results from the present operating range is increased for diagnosis. In 55, it is checked whether an unusual deviation of the oil pressure from the oil pressure setpoint value is present, in that it is compared with a threshold value 56. If an unusual deviation is established, 55 continues to be repeated (57) until this deviation is no longer present (continue with 58).

In 58, the OPCJ valve is driven, whereby it is opened (closed) in 59. In 60, a corresponding clock is started, with the aid of which the measuring time (i.e. the diagnostic event time window) is determined. If the measuring time exceeds a threshold value 61, the clock is reset in 62 and the diagnostic event is ended. In 63, an oil pressure peak (or dip) is sought within the measuring time, the time at which the peak is found being stored in 64. The located oil pressure peak as well as the time at which it was found are compared with operating range-dependent limits 65 (i.e. it is checked whether the oil pressure measuring point is within the predetermined oil pressure measuring point range).

Two logic operations are provided for this purpose: an AND operation 66 and an AND operation 67.

The following is incorporated into AND operation 66: If the absolute value of the peak is greater than the oil pressure threshold value AND the peak is outside the predefined time window, the result is discarded.

The following is incorporated into AND operation 67: If the absolute value of the peak is greater than the oil pressure threshold value AND the peak is within the predefined time window, a positive counter 68 is incremented.

If the absolute value of the peak is less than the oil pressure threshold value, a negative counter 69 is incremented.

A limit value is set in each case for positive counter 68 as well as for negative counter 69, after which the fact that either an error is present or the OPCJ valve is functioning properly is entered in a register 70 (for positive counter 68) or a register 71 (for negative counter 69).

In other word, the method continues to be iterated (72) until the fact that the OPCJ valve is either functioning properly or not functioning properly is diagnosed a sufficient number of times.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diagnostic method for an oil piston cooling jet valve (OPCJ valve) of an oil pressure system of an internal combustion engine of a motor vehicle, the method comprising:
   driving the OPCJ valve to detect oil pressure diagnostic data if multiple enabling conditions have been met; and
   determining whether an oil pressure measuring point is within a predefined oil pressure measuring point range,
   wherein the multiple enabling conditions comprising:
   a presence of a stationary operation of the internal combustion engine;
   a presence of a predetermined operating range;
   a presence of an oil temperature within a predetermined oil temperature range;
   a prevention of a scheduled driving of the OPCJ valve for regular piston cooling; and
   prevention of an error of the oil pressure system.

2. The diagnostic method according to claim 1, wherein the oil pressure measuring point is within the predefined oil pressure measuring point range if an oil pressure exceeds a predefined oil pressure threshold value and a point in time at which the oil pressure exceeds the predefined oil pressure threshold value is within a predefined time interval.

3. The diagnostic method according to claim 1, wherein the operating range is represented by at least one of the variables engine rotational speed, engine torque and oil temperature.

4. The diagnostic method according to claim 1, wherein a stationary operation of the internal combustion engine is present when an engine rotational speed changes within a predefined engine rotational speed range, an engine torque changes within a predefined engine torque range and/or an angle of an intake camshaft and/or an exhaust camshaft changes in each case within a predefined angle range.

5. The diagnostic method according to claim 1, wherein the driving comprises an opening and/or closing of the OPCJ valve.

6. A diagnostic device for an oil piston cooling jet valve (OPCJ valve) of an internal combustion engine of a motor vehicle, the diagnostic device being configured to carry out the diagnostic method according to claim 1, the diagnostic device comprising:
   a positive counter device that is configured to increment a positive count value when the oil pressure measuring point is within the predefined oil pressure measuring point range; or
   a negative counter device that is configured to increment a negative count value when the diagnostic method determines that the oil pressure measuring point is outside the predefined oil pressure measuring point range.

7. The diagnostic device according to one of claim 6, wherein a diagnosis result is discarded if the diagnostic method determines that the oil pressure measuring point exceeds the oil pressure threshold value at a point in time which is within a diagnostic event time window and outside the predefined time interval.

8. A control unit for a motor vehicle, which comprises a diagnostic device according to claim 6.

9. A motor vehicle comprising a diagnostic device according to claim 6.

10. The diagnostic device according to claim 6, comprising:
   the positive counter device; and
   the negative counter device.

11. The diagnostic device according to claim 10 wherein the negative count value is incremented when the oil pressure does not exceed the oil pressure threshold value and/or when the point in time is outside the predefined time interval.

12. The diagnostic method according to claim 1, further comprising:
   incrementing a positive count value if it is determined that the oil pressure measuring point is within the predefined oil pressure measuring point range; and
   incrementing a negative count value if it is determined that the oil pressure measuring point is outside the predefined oil pressure measuring point range.

13. The diagnostic method according to claim 12, wherein the negative count value being incremented if the oil pressure does not exceed the oil pressure threshold value and/or if the point in time is outside the predefined time interval.

14. The diagnostic method according to claim 1, wherein if any sensors or actuators of the oil pressure system are detected as being defective, then the diagnostic method is blocked.

15. The diagnostic method according to claim 1, further comprising:
   determining if the multiple enabling conditions have been met; and
   repeating at regular intervals said determining if the multiple enabling conditions have been met.

16. The diagnostic method according to claim 15, further comprising interrupting the diagnostic method if it is determined that the multiple enabling conditions are no longer met.

17. The diagnostic method according to claim 1, wherein, if the multiple enabling conditions have been met, increasing an oil pressure setpoint value.

18. A diagnostic method for an oil piston cooling jet valve (OPCJ valve) of an oil pressure system of an internal combustion engine of a motor vehicle, the method comprising:
   driving the OPCJ valve to detect oil pressure diagnostic data if multiple enabling conditions have been met; and
   determining whether an oil pressure measuring point is within a predefined oil pressure measuring point range,
   wherein the multiple enabling conditions are selected from the group consisting of:
      a presence of a stationary operation of the internal combustion engine;
      a presence of a predetermined operating range;
      a presence of an oil temperature within a predetermined oil temperature range;
      a prevention of a scheduled driving of the OPCJ valve for regular piston cooling; and
      prevention of an error of the oil pressure system.

* * * * *